(12) United States Patent
Forlong

(10) Patent No.: US 8,089,024 B2
(45) Date of Patent: Jan. 3, 2012

(54) TORCH SPACING APPARATUS

(75) Inventor: Murray Houlton Forlong, Auckland (NZ)

(73) Assignee: Eigen Systems Limited, Albany (NZ)

( * ) Notice: Subject to any disclaimer, the term of this patent is extended or adjusted under 35 U.S.C. 154(b) by 662 days.

(21) Appl. No.: 12/212,001

(22) Filed: Sep. 17, 2008

(65) Prior Publication Data

US 2009/0071944 A1    Mar. 19, 2009

(30) Foreign Application Priority Data

Sep. 19, 2007   (NZ) ........................................ 561696

(51) Int. Cl.
*B23K 10/00*    (2006.01)
(52) U.S. Cl. ......... 219/121.39; 219/121.56; 219/121.58; 219/121.48
(58) Field of Classification Search .......... 219/121.37–121.39, 121.45, 121.48, 219/121.54, 75
See application file for complete search history.

(56) References Cited

U.S. PATENT DOCUMENTS

| | | | |
|---|---|---|---|
| 7,071,441 B1* | 7/2006 | Bulle | 219/121.39 |
| 7,674,998 B2* | 3/2010 | Ohnishi et al. | 219/121.39 |
| 2007/0241083 A1* | 10/2007 | Yamaguchi et al. | 219/121.39 |

* cited by examiner

*Primary Examiner* — Mark Paschall
(74) *Attorney, Agent, or Firm* — Young & Thompson

(57) ABSTRACT

A torch spacing apparatus for a plasma or flame cutting machine includes a gantry that is guided to travel in an X axis. Mounted to the gantry is at least one carriage that is/are guided to travel in a Y axis. Mounted to each carriage are selected tooling having at least two cutting torches mounted thereon with an active cutting tool in an active cutting position. The carriage is mounted to enable tooling substitution whereby the torch spacing apparatus includes a substitution mechanism which is operatively attached to the carriage and tooling such that the said substitution mechanism is adapted to allow the position of a cutting torch or active cutting torch to be substituted with another cutting torch currently in the active position to space the torches accordingly by rotating the cutting tools about a Z axis.

6 Claims, 3 Drawing Sheets

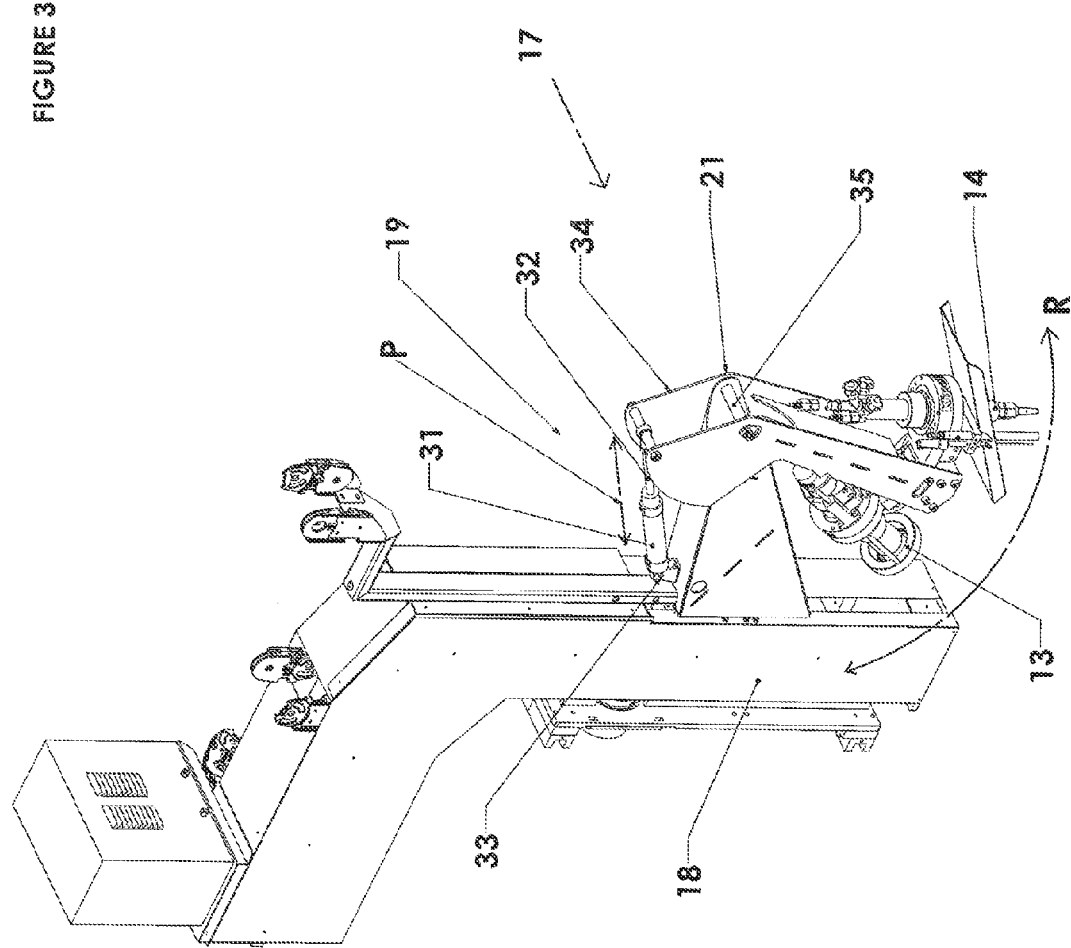

TORCH SPACING APPARATUS

The invention relates to a torch spacing apparatus adapted to enable various cutting torches to maintain close spacing and to a method of substituting tooling. The invention is directed particularly but not solely towards a pivot system apparatus for substituting cutting torches for precision high definition cutting machines for steel or any other suitable material.

BACKGROUND OF INVENTION

Normally on flame and plasma cutting machines having a bridge, the bridge is fitted with multiple tooling such as oxy fuel torches and multiple plasma cutting torches on movable carriages. The cutting machine is fitted with multiple carriages where each carriage is fitted with one each of the different cutting heads of either plasma or oxy fuel or other cutting heads such as marking, laser cutting, drilling or the like. The cutting machine allows for the spacing of the carriages to be adjusted by manual or automatic methods. The carriage spacing is then set and all the carriages supportively move together on a gantry. Each cutting tool currently need their own lifter mechanism on a common carriage which is redundant when that tool type is not required.

Typically flame cutting machines allow for multiple oxy fuel torches to be used to simultaneously cut out parts. Conversely the plasma cutting machines allow for multiple plasma torches to be used to simultaneously cut out parts of a steel product-for example. The plasma torches and the oxy torches do not operate at the same time.

There are problems with this type of torch arrangement whereby to ensure the spacing between torches (or torch heads) is minimised, the cutting machine is often set up with different carriages which are each fitted with both a plasma and oxy fuel torch. Each carriage can be spaced according to the distance required between the parts being cut (eg steel parts). However due to the inclusion of the other cutting heads between adjacent cutting heads of the same type, the minimum spacing of the same type cutting heads is increased in a side by side type relationship.

A cutting machine may be for example fitted with five carriages, the first two carriages fitted with a plasma cutting torch head or an oxy torch head, and a drilling head, the last three carriages being fitted with only oxy torch heads. Thus allowing for up to two tool cutting heads with either plasma or drilling and up to five simultaneously with the oxy fuel cutting heads. All individual tool heads have an independent vertical guide system and vertical control system.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT OF THE INVENTION

It is an object of the invention to provide an improved torch or cutting tool spacing apparatus and method of substituting tooling such as cutting torches that minimise the spacing between cutting heads and ameliorates some of the disadvantages and limitations of the known art or at least provide the public with a useful choice.

SUMMARY OF INVENTION

In a first aspect the invention comprises a torch spacing apparatus for a plasma or flame cutting machine having a gantry that is guided to travel in an X axis, mounted to the gantry is at least one carriage that is/are guided to travel in a Y axis with the X axis and Y axis being in a horizontal plane and mounted to each carriage are selected tooling having at least two cutting torches mounted thereon, there being an active cutting tool in an active cutting position, the carriage is mounted to enable tooling substitution whereby the torch spacing apparatus includes a substitution mechanism 17 which is operatively attached to the carriage and tooling such that the said substitution mechanism 17 is adapted to allow the position of a cutting torch or active cutting torch to be substituted with another cutting torch currently in the active position to space the torches accordingly by rotating the cutting tools about a Z axis in vertical or perpendicular plane to the horizontal plane.

Preferably, the substitution mechanism 17 includes a lifting and guiding mechanism 18 and an activation means 19 comprising at least one pneumatic cylinder operatively and pivotally connected to a cradle having the cutting tools operatively mounted thereto, the cradle being mounted to the lifting and guiding mechanism 18 whereby operation of the substitution mechanism causes the cradle to rotate in the Z axis.

Preferably the cradle forms a frame including rod members between side members wherein the side members are bent about a pivot means whereby rotation about the pivot means causes said torch substitution.

Preferably the apparatus is substantially as herein before described with reference to the accompanying drawings.

In a second aspect the invention comprises a gantry movably supported on a plasma or flame cutting machine that is guided to travel in an X axis, mounted to the gantry is at least one carriage that is/are guided to travel in a Y axis and mounted to each carriage are selected tooling having at least two cutting torches mounted thereon, there being an active cutting tool in an active cutting position, the carriage including at least one tool spacing apparatus as claimed in claim 4 to enable the tools to be substituted as required.

In a third aspect the invention comprises a carriage adapted to be movably supported as part of a plasma or flame cutting machine, the carriage is guided to travel in a Y axis on and is mounted to a gantry that is in turn guided to travel in a Y axis and mounted to each carriage are selected tooling including at least two cutting torches mounted thereon, there being an active cutting tool in an active cutting position, the carriage mounted to enable tooling substitution whereby the carriage includes a substitution mechanism 17 which is operatively attached to the carriage and tooling such that the said substitution mechanism 17 is adapted to allow the position of a cutting torch or active cutting torch to be substituted with another cutting torch currently in an active position to space the torches accordingly by rotating the cutting tools about a Z axis.

In a fourth aspect the invention comprises a method of mounting tooling on a cutting machine to allow for minimizing the spacing that can be physically achieved which can be carried out whereby tools are positioned to enable the desired tool to be substituted to the active tool position where by the act of moving the redundant tool is such that the redundant tool is removed from the area between adjacent active cutting tools.

In a fifth aspect the invention comprises a mechanism to eliminate the costly addition of multiple programmable lifter mechanisms that are required for different tooling. As only one type of selected tooling can operate at any one time, the other tooling with it's costly lifter mechanism is redundant until that tooling is required.

Preferably the mechanism allows for the redundant cutting tool to be removed from the active tools proximity thus protecting the redundant tools.

BRIEF DESCRIPTION

The invention will now be described, by way of example only, by reference to the accompanying drawings:

FIG. 3 is an upper perspective close up view of one substitution assembly mechanism as shown in FIG. 2.

DESCRIPTION OF THE INVENTION

The following description will describe the invention in relation to preferred embodiments of the invention, namely a tool substitution mechanism. The invention is in no way limited to these preferred embodiments as they are purely to exemplify the invention only and that possible variations and modifications would be readily apparent without departing from the scope of the invention.

Figure 1:
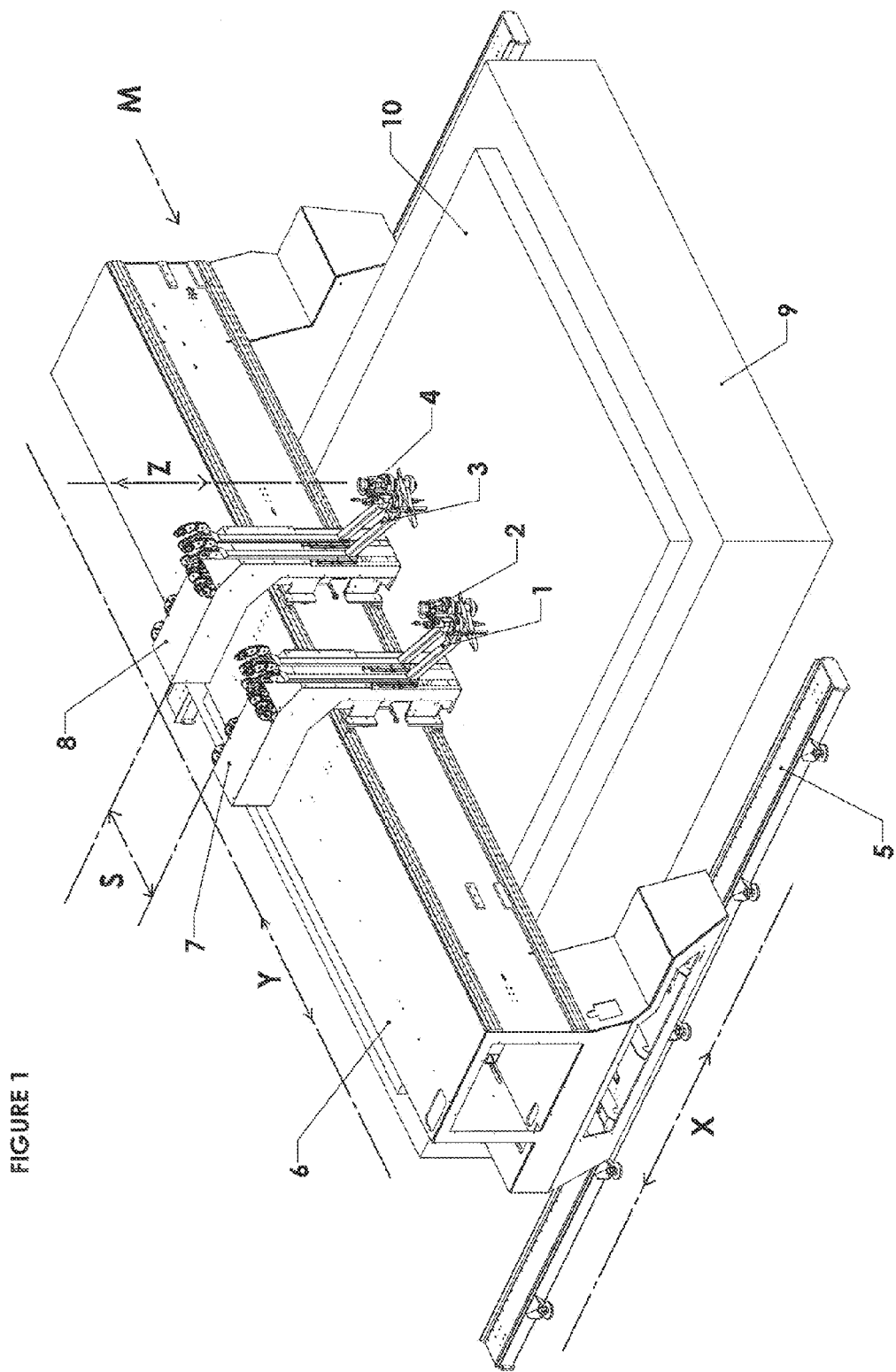
FIG. 1 is a perspective view of a machine as currently available with cutting heads mounted adjacent to each other.

FIG. 1 is a schematic showing a typical current method for a plasma or flame cutting machine M for cutting a product such as steel for example, whereby cutting tools 1, 2, 3, 4 such as plasma or flame torches are mounted on a movable gantry 6 straddling a cutting table 9. The gantry 6 has moveable carriages 7 & 8 thereon. Cutting tools 1-4 are lined up side by side in front of carriages 7 & 8 thereby limiting the spacing between same type tooling. Gantry 6 travels in an X axis (see item "X" and the double ended arrow defining the direction of the axis and travel as used throughout the drawing figures) and is guided along rail or track 5. As shown in drawings the X axis and Y axis form a horizontal plane and Z axis is perpendicular to this horizontal plane of the X and Y axis.

Rail or track 5 is located on each side of the cutting table defining the X axis. Carriages 7 and 8 are the tool carriages which carry the tooling which such carriages move along gantry 6 in the Y axis direction. The spacing between carriages 7 and 8 is either manual or automatic but once the spacing is set the two carriages 7 and 8 maintain the side by side spacing S so that the common tooling items 1 and 3 or conversely items 2 and 4 can operate at constant spacing while working on the product which may be plate shown as item 10 and supported on the cutting table which can be a structure such as a table shown as labelled item 9 in the figures.

Figure 2:
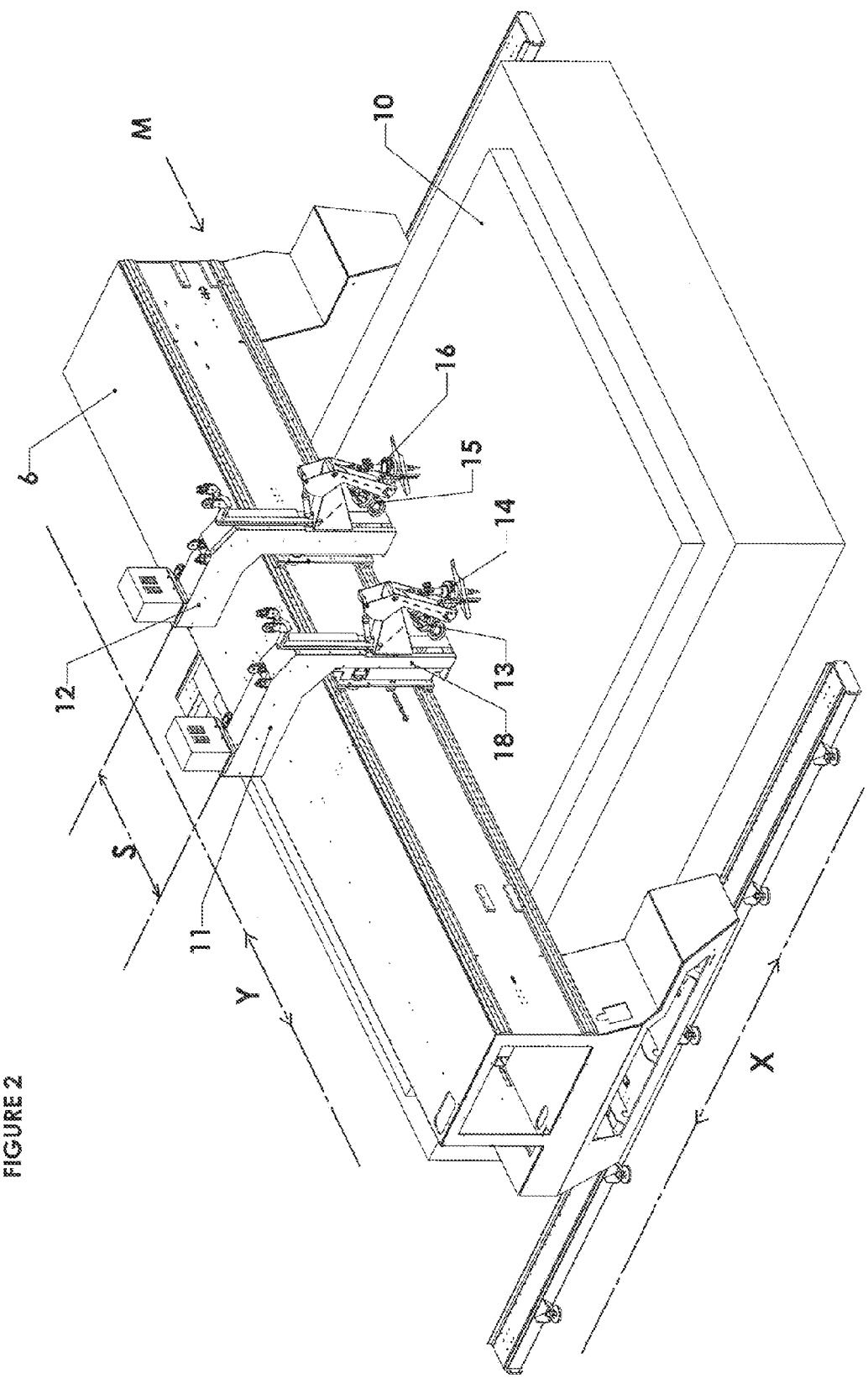
FIG. 2 is a perspective view of the machine assembly in accordance with one preferred embodiment of the invention.

FIG. 2 shows the invention where the various types of selected tooling shown as items 13, 14, 15 and 16 are mounted onto narrow carriages shown labelled as items 11 and 12. The mounting of tooling 13 and 14 in the way as shown onto carriage 11 allows for these two tools 13 and 14 to be raised and lowered by a substitution mechanism as shown as item 17. The substitution mechanism 17 is adapted to enable the tooling 13-16 to keep clear of the space S or distance or area between carriages 11 and 12 thus reducing the minimum spacing between tools.

FIG. 3 shows a close up of the individual carriage substitution mechanism 17 including a lifting and guiding means 18 and an activation means item 19 that allows the different tooling to be substituted from active positions. As shown activation means 19 can be provided by any suitable moving means such as for example a piston or pneumatic cylinder having at least one cylindrical arm receiving base 31 and an extending arm 32 that is operatively attached to vertical lifting and guiding means 18 at one end 33 which is in communication with other means to allow control thereof as required via control means (not shown). The piston arm 32 is pivotally attached to one end of a bent pivoting cradle (made up of a frame with side plates 34 and adjoining rods 35 there-between) with at least two cutting tools 13 & 14 in a spaced configuration as shown which allows in use for the arm 32 to extend or retract to in-turn rotate the cradle frame thereby also rotating one tool for the other in a vertical plane R parallel to the vertical axis as shown in FIG. 3.

In FIG. 3 item 14 which is for example an oxy fuel torch, is in an active position which is the vertical position and the activation means ie in this example the pneumatic cylinder piston arm 19 is shown in an extended position. Currently the cutting tool 14 is in a vertical position in an active position and the other cutting tool 13 being in an angled vertical position is in non active position. To change the active tooling, activation means 19 which is a pneumatic cylinder would retract (see direction arrow P) moving, cutting tool 13 (ie the non-active tool) to the vertical position and rotatably moving, cutting tool 14 up pivoting up and out of the way of the active tool 13 about pivot means 21 in the rotational direction of R as shown. Each cutting tool is operatively connected to the cradle and lifting, guiding mechanism 18 and activation means 19 of the substitution mechanism 17 of the present invention to a power means to enable each tool to be rotated or substituted and work, as designed to cut the product accordingly.

Advantages
 a) Spacing between any type of cutting tooling can be decreased
 b) Elimination of multiple vertical lifter mechanisms
 c) Tooling not in use is moved away from the hazardous cutting environment Variations Throughout the description of this specification, the word "comprise" and variations of that word such as "comprising" and "comprises", are not intended to exclude other additives, components, integers or steps. Any number of cutting torches or cutting tools as required can be attached to the cradle.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

What I claim is:

1. A torch spacing apparatus for a cutting machine fitted with multiple tools for simultaneously performing multiple tool operations, and capable of substituting one type of tool for another to enable operation of different tools to operate with a minimum spacing, the machine having a gantry that is guided to travel along an X axis, at least two carriages mounted to the gantry and guided to travel along a Y-axis, and at least two cutting torches mounted to each carriage, the apparatus comprising:

a substitution mechanism operatively attached to each carriage, the substitution mechanism including a lifting and guiding mechanism, an activation means, and a cradle, the activation means comprising at least one pneumatic cylinder pivotally connected to the cradle, the cradle being mounted to the lifting and guiding mechanism and configured for having the at least two cutting torches operatively mounted thereto, the cradle configured to operatively perform a torch substitution, wherein a first of the at least two cutting torches is substituted with a second of the at least two cutting torches, by rotating the at least two cutting torches about a rotation axis parallel to the X axis of the gantry, thereby to operatively rotate the first of the at least two cutting torches out from a vertical active position and simultaneously rotate the second of the at least two cutting torches into the vertical active position.

2. The apparatus as claimed in claim 1 wherein the cradle comprises a frame including side members and rod members between said side members, the side members being bent about a pivot means about which the at least two cutting torches rotate during operation of said torch substitution.

3. A gantry movably supported on a cutting machine that is guided to travel along an X axis, the gantry having mounted thereon at least one carriage configured to travel along a Y axis, each carriage having mounted thereto tooling that comprises at least two cutting torches, the carriage configured to maintain one of the at least two cutting torches in an active cutting position as an active cutting tool, the carriage including at least one tool spacing apparatus as claimed in claim 1.

4. A carriage adapted to be movably supported on a cutting machine, the carriage configured to travel in a Y axis and along a gantry extending in an X axis, the carriage comprising:

a substitution mechanism including a lifting and guiding mechanism, an activation means, and a cradle, the activation means comprising at least one pneumatic cylinder pivotally connected to the cradle, the cradle being mounted to the lifting and guiding mechanism and configured for having the at least two cutting torches operatively mounted thereto, the cradle configured to operatively perform a torch substitution of a first of the at least two cutting torches with a second of the at least two cutting torches by rotating the at least two cutting torches about a rotation axis parallel to the X axis of the gantry, thereby to operatively rotate the first of the at least two cutting torches out from a vertical active position and simultaneously rotate the second of the at least two cutting torches into the vertical active position.

5. A carriage for carrying plural cutting tools on a cutting machine, the carriage comprising:

a mounting arm for attachment to a gantry of the cutting machine;

a lifting and guiding mechanism extending from the mounting arm;

an activation device connected to the lifting and guiding mechanism, the activation means comprising at least one pneumatic cylinder; and a cradle pivotally mounted to the lifting and guiding mechanism and the at least one pneumatic cylinder, the cradle configured for having at least two cutting tools mounted thereto, a first of the at least two cutting tools being held by the cradle in a vertical active position, wherein the activation device is configured to operatively cause the cradle to rotate the at least two cutting torches about a rotation axis to operatively rotate the first of the at least two cutting torches out from the vertical active position and simultaneously rotate a second of the at least two cutting torches into the vertical active position, thereby to substitute the first of the at least two cutting torches with the second of the at least two cutting torches.

6. The carriage as claimed in claim 5, wherein the mounting arm is configured to slide along a length of the gantry extending in a first direction, and wherein the activation device is configured to cause the cradle to rotate about a rotation axis that extends parallel to the first direction of the gantry.

\* \* \* \* \*